Oct. 7, 1969 J. A. LANGONE 3,471,223

METHOD OF PRODUCING ACTION PICTURE MEDIA

Filed May 6, 1966 2 Sheets-Sheet 1

INVENTOR
JAMES ANTHONY LANGONE

BY L. L. Kahan
ATTORNEY

Oct. 7, 1969 J. A. LANGONE 3,471,223

METHOD OF PRODUCING ACTION PICTURE MEDIA

Filed May 6, 1966 2 Sheets-Sheet 2

INVENTOR

JAMES ANTHONY LANGONE

BY [signature]

ATTORNEY

United States Patent Office 3,471,223

Patented Oct. 7, 1969

3,471,223
METHOD OF PRODUCING ACTION PICTURE MEDIA

James Anthony Langone, Hightstown, N.J., assignor, by mesne assignments, to Westinghouse Learning Corporation, New York, N.Y., a corporation of Delaware Filed May 6, 1966, Ser. No. 548,295
Int. Cl. G03b *21/32*
U.S. Cl. 352—38 5 Claims

ABSTRACT OF THE DISCLOSURE

A method for making instructional films wherein two rows of sequential action images having the same image orientation are photographed such that one row may be subsequently exhibited as the film is moved in one direction while the other row is exhibited as the film is moved in the opposite direction. In the technique, the first row is filmed on one side of the film centerline, the film is then turned relative to the camera 180° about a point on the film centerline and perpendicular to the film plane, and last the camera and film as a unit are turned 180° about its optical axis to dispose the film in the same relative position as during the first row production such that the second row is filmed on the opposite side of the film centerline as the film moves in the direction opposite to that of filming the first row.

This invention relates to a novel method of producing an action picture media having adjacent rows of sequential images, and which is especially suitable for audio-visual teaching equipment. More particularly, the invention relates to the novel and relatively inexpensive production of two-track action picture strips wherein the image sequence in each track or row is intended for exhibition by running in opposite directions, respectively.

The versatility of such two-track strips for educational purposes is set forth at length in the copending application Ser. No. 534,843, filed Mar. 16, 1966, wherein one track or row of images may be advanced in a forward direction and used for instructional information, and the second track or row is fed in the reverse direction and furnishes supplementary or remedial instruction.

In general, and as disclosed in the above-identified application, it is desired to advance a dual track action picture media, such as a motion picture film, in one direction while exhibiting a lesson sequence from a portion of one track. At the end of a particular lesson sequence, the student is tested, and if the answer is correct, the action picture film is advanced to the next sequence in the first track.

Should, however, the student incorrectly answer the test question, the second track of the two-track film is then exhibited and the film run in the reverse direction to present the remedial material. At the conclusion of the remedial material, the film has returned to or near the point at which the incorrectly answered lesson sequence of the first track began, whereupon the film projection is shifted and again run in the forward direction to re-exhibit the first track and re-expose the lesson to the student.

It is to be understood that the image and audio medium as described herein may include such action-picture audio-visual media as optical motion picture films with sound, and magnetic recording and thermoplastic media which may produce both visual images and sound.

Simplicity of equipment and exhibition, and therefore minimum cost, indicates that the orientation of the scenes in the film frame images be the same in each row, e.g., upright, either when the images are oriented parallel or perpendicular to the direction of film travel, notwithstanding that each row is exhibited by running the film in opposite directions. It is apparent that such a motion picture film cannot be made or produced in the conventional manner of "shooting" or photographing the usual single-row image frame movie film or the "double 8" technique where the orientation of the two image rows is 180° from each other.

It is therefore a principal object of the present invention to provide an effective method of producing a two-track action picture media wherein the image sequences of each track run respectively in opposite directions and wherein also the orientation of the illustrations and intelligence for each sequenced image is uniform and similar in both tracks. It is another object of the present invention to provide a means whereby two-row image sequences with respective opposite-direction runs may be produced on a single reel or supply of motion picture film by novel manipulation of the film and camera, the latter being only slightly modified from conventional constructions.

It is a further important object of the present invention to provide a method of producing a reel of film of the type described by "shooting" or photographing in a unique manner a single row on each of two separate films, and producing therefrom a composite film of the type contemplated, which technique facilitates extensive editing and further enhances the versatility of the two-row film.

These and other objects of the present invention will become apparent as it is better understood from the following description, which, taken in connection with the accompanying drawings, discloses a preferred embodiment thereof.

Referring to the drawings.

Figure 1:
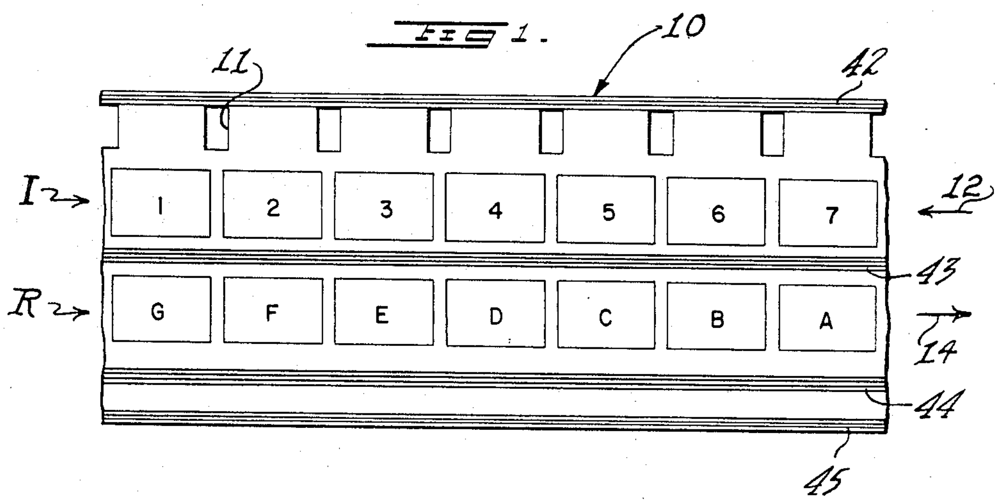
FIGURE 1 is a fragmentary diagrammatic and schematic representational view of an audio-visual action picture film produced in accordance with the present invention.

As a preferred or exemplary embodiment of the instant invention, there is shown in FIG. 1 a simplified fragmentary representation of a motion picture film strip, generally designated 10, produced according to the invention. The film 10 has conventional feed means such as sprocket holes 11 thereon and the film strip is provided with two parallel rows of images I and R. As illustrated, the individual frames as at 5 or D, for example, preferably have the longer rectangular frame dimension extending longitudinally of the film in a path parallel to the film longitudinal centerline, and with the frame image orientation in both rows being uniform, namely perpendicular to the film longitudinal centerline. This arrangement is desirable in connection with individual audio-visual film viewers inasmuch as it facilitates film projection from a laterally inserted, horizontally disposed motion picture film cartridge wherein the film 10, during exhibition, passes horizontally through the projection mechanism. Of course, using such optical accessories as prisms of mirrors, the image may be rotated optically to appear in a vertical position. It is apparent, however, that the image orientation in the rows might be parallel to the film centerline if desired or convenient.

As explained more fully in the hereinbefore mentioned copending application, the image frames 1, 2, 3, etc., of row I comprise sequences of instructional material wherein the film images are arranged for exhibition by film strip movement in the direction indicated by arrow 12, while the successive frames A, B, C, etc., of row R comprise supplementary or remedial lesson sequences whereinq the frame images are arranged for exhibition by film strip movement in the reverse direction, or in the direction of arrow 14.

The photography and production of motion picture film having two parallel rows of film image sequences wherein both rows are uniformly oriented as to their image presentation, while the said rows are intended for opposite direction running, presents practical problems of film-making which are obviated by the present invention. It is especially important from the standpoint of educational or instructional audio-visual motion picture film to minimize the production cost thereof whereby to maximize the utilization thereof in the classroom. The present invention achieves this object in a highly effective and simple manner with minimal essential changes to the conventional motion picture camera employed to photograph the lesson material.

Figures 2, 3:
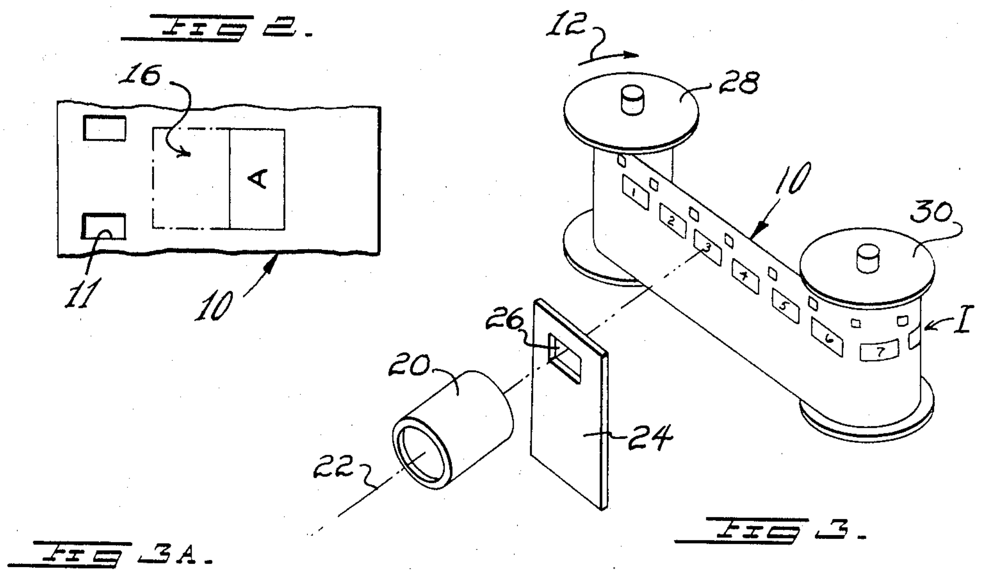
FIG. 2 is a fragmentary view of a motion-picture film illustrating the relationship between the image frame of one row according to this invention as compared with the conventional single-row image frame.
FIGS. 3, 4 and 5 are simplified diagrammatic perspective views of successive steps in producing the film arrangement of the present invention.

Referring to FIG. 2, the conventional motion picture camera takes film images comprising a single row thereof between the edges of the film, one film frame being represented as 16 and encompassing both the full line and dashed line rectangular outline, and wherein the film is normally exposed and exhibited during running thereof in a vertical direction. Further as is conventional, the optical axis during exposure or exhibition is disposed on the centerline of the film strip.

Figure 3A:
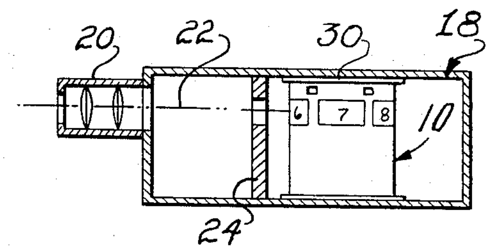
FIGS. 3A, 4A and 5A are similar diagrammatic sectional elevation views of the film-making stages of FIGS. 3, 4 and 5, respectively, further shown as associated with a simplified camera housing.

In the present invention, the camera may be slightly modified by moving the optical axis off-center with respect to the film width or longitudinal centerline thereof, as is diagrammatically represented at FIG. 3A, for example, wherein it will be noted that the simplified camera, generally designated 18, is provided with a lens 20 which has been relocated from a normal medial position relative to the film and camera, to the illustrated position providing the offset optical axis 22. As seen in FIG. 3, this arrangement will effect photographing of the numbered-frame film row I. In like manner, the conventional aperture plate is removed, and a modified aperture plate 24 having an offset aperture therein at 26 is substituted. It is also possible to provide a mask for either the film aperture plate or the optical system without moving the optical axis in order to expose only a portion of the total frame.

With respect to the overall essential camera construction and operation, these are the major elements that are modified in carrying out the invention, and in this connection as well as for purposes of clarity, all other usual camera mechanism has been omitted from the drawings to facilitate the understanding of the present concepts.

In like manner, the relative positioning of the lens, plate, and film is for illustrative purposes, and is not intended to accurately portray these relationships as is clearly understood by those skilled in the art.

The camera setup of FIG. 3A corresponds to the perspective arrangement of FIG. 3 wherein the camera housing has been removed for clarity, and it will be seen that the film 10, during filming of the motion picture, is driven in the direction 12 in transferring the film from supply to takeup, such as the representative spools 30, 28, in the course of producing the instructional sequence I, and thereby producing the film frame images 1, 2, 3, etc., as seen in FIG. 3.

Further, as is clearly apparent from FIGS. 3 and 3A, it is preferred that the camera be held or mounted to dispose the film horizontally, whereby to produce film images whose vertical orientation is perpendicular to the longitudinal film centerline, although it will be understood that the principles of the present invention are equally as well achieved with the camera mounted for a vertical film run in the event a vertical format exhibition is ultimately desired.

Also, as is well understood by those versed in the art, the camera lens 20 will normally invert the photographed image onto the film. This has not been shown specifically in the drawing however, as the principles of the present invention are not altered thereby.

Thus, at the completion of the first filming strip of FIGS. 3 and 3A, the film will be wound onto the spool 28 and the desired instructional strip or row I will have been recorded, comprising the plurality of sequences 1, 2, 3, etc., as planned throughout the length of the film. Upon completion thereof, it then becomes necessary to film the second row R of remedial sequences in correlation with the first row instructional sequences I, and, as noted, the correct orientation and run-direction of the film must be obtained.

Figures 4, 4A, 5, 5A:
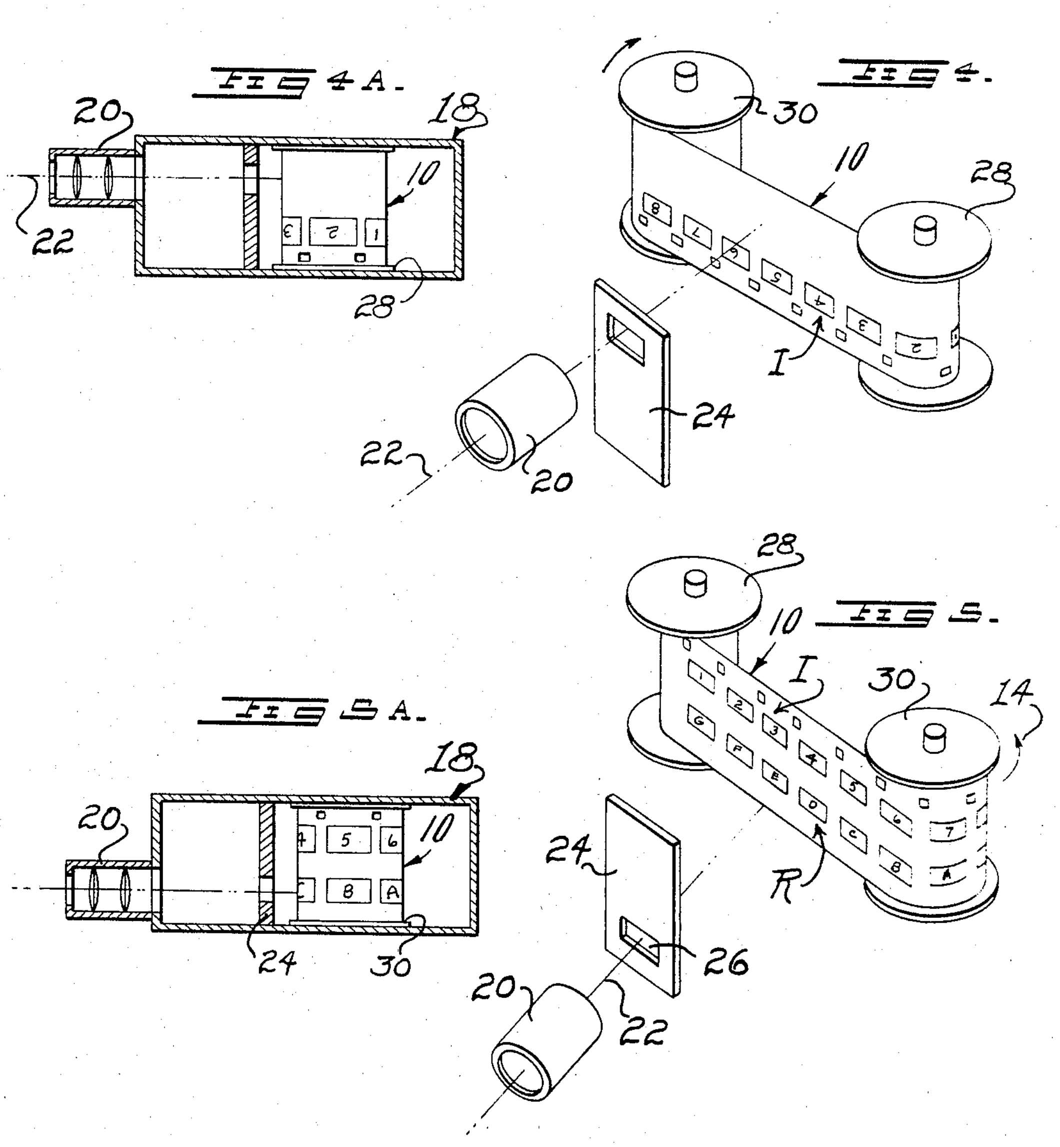

To this end, and as seen in FIGS. 4 and 4A, the film spools 28 and 30 are first removed from the camera 18 and turned 180° about an axis perpendicular to the film plane and replaced in the camera. Thus, spool 28 in FIG. 4 now occupies the position of spool 30 in FIG. 3, and vice versa. In one practical form of achieving this result, a suitable film cartridge can be removed from the camera, merely inverted, and replaced therein. This action will, of course, have the result of positioning an unexposed area of the film 10 in line with the optical axis 22 for the subsequent photographing of the second row remedial strip R parallel to the instructional strip I.

Note in FIGS. 4 and 4A that the inversion of the film at this stage causes the inversion of photographed film sequence I. If the camera were now employed to photograph the remedial sequence row I, it will be apparent that the resultant rows R and I would have oppositely facing image orientations. This may be visualized by considering the letters A, B, C in FIG. 1 to be inverted in their respective frames without altering row I. As noted, it is desirable that the orientation of each row be similar, as seen in FIG. 1.

Accordingly, after the initial step of inverting the roll of film (or cartridge, etc.), subsequent to filming row I, the camera 18, as a unit, is then turned through 180° by rotation about optical axis 22 to produce the orientation of FIGS. 5 and 5A, wherein the lens 20 remains aligned with the row R to be filmed and which is now positioned at the bottom, relatively, of the camera. This 180° orientation just described has the effect of again repositioning the illustrative film spools 28, 30 to the same positions partaken initially in FIG. 3. Note, however, that the optical axis 22 is aligned with the row R to be photographed to produce sequences A, B, C, etc. In addition, the film spools are driven in the opposite direction as indicated by arrow 14, thereby exposing the film in a direction opposite from that of the instructional row I. The resultant second row film images have the same relative image orientation with respect to those of row I.

If desired, the image may be turned 180° optically by means of suitable optical accessories well known to those skilled in the art.

Subsequent conventional processing of the filmed roll and mounting the same in a suitable exhibiting cartridge permits the instructional sequences I to be projected by running the film in direction 12 (FIG. 1) with the projection axis aligned with row I. As discussed in the copending application, when remedial material is necessary, it is only necessary to shift the projection axis from row I to row R without any manual handling or inverting of the film or film cartridge, and thereafter exhibiting the remedial row R while running the film in the reverse direction 14. This reverse running, it will be noted, will return the film strip to a position at or near the beginning of a lesson sequence 1, 2, 3, etc., in the instructional row I, which latter is then re-exhibited after the remedial sequence by subsequent forward direction movement.

While the method of the foregoing description will uniquely achieve the results intended, the same is preferable for action picture sequences where little or no editing is, or will be, normally required. Thus, any major or lengthy changes desired in either the instructional row I or the remedial row R are forestalled, as major cutting or deletion of one row necessarily cuts or alters the intended sequence in the other row.

Accordingly, for film-making where extensive editing is necessary or is likely to be necessary, the practice of the present invention can be employed in a slightly modified form while producing a film similar to the film as shown in FIG. 1.

In the modified form of film producing, a first film, as before, is initially exposed with the arrangement of FIGS. 3 and 3A to produce an instructional sequence I. Thereafter, the roll or supply of film bearing the single off-center instructional film row I is removed from the camera and processed.

Figure 6:
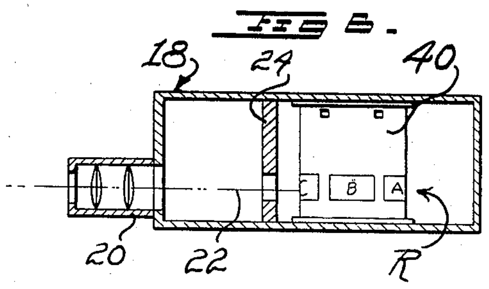
FIG. 6 is a diagrammatic sectional elevation view similar to FIG. 4A, but showing the arrangement as employed in a modified form of the invention.

A second supply of film as at 40 (FIG. 6) is inserted in the camera, and the camera is then inverted 180° about its optical axis 22 from the FIG. 3 position to that of FIG. 6, which corresponds in effect to the FIG. 5A position. Thus disposed with the lens lowermost, the second roll of film 40 is exposed, producing the remedial sequence A, B, C of row R thereon, and this second roll of film is taken from the camera and processed.

Either or both rows of film, namely that of FIG. 3 and that of FIG. 6 are edited as desired utilizing techniques well known in the art, after which the first roll of film having the instructional sequence I is contact printed onto a final master film. The second film 40 of FIG. 6, with remedial sequence R thereon, is contact printed onto the master film, so as to produce a resultant film as contemplated by the invention and having the appearance of the film 10 in FIG. 1. If desired, the first roll may be contact may be contact printed while the final film master is moved in one direction, and the second film 40 may be contact printed while the final film master is moved in the opposite direction.

It will be seen that the present invention provides a very inexpensive technique of making and editing action picture sequences whereby the same image recording equipment is enabled to take both forward and reverse tracks on the medium and wherein also no major or technically difficult modifications in existing techniques or equipment are required, thereby minimizing expense. Further, as is apparent, multiple audio tracks as at 42, 43, 44, 45 may also be recorded in conjunction with either or both action picture tracks.

While the present invention has been disclosed in conjunction with audio-visual instructional purposes wherein major benefits are realized, it is apparent that the invention finds utility in other and different action picture making environments in addition thereto, as in trick-film work, etc.

It is thought that the invention and many of its attendant advantages will be understood from the foregoing description and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of making an instructional action picture film wherein there is produced a first row of sequential action images having an ordered exhibition sequence in one direction of medium movement, said first row having a predetermined image orientation and disposing said row to extend along said medium on one side of the longitudinal centerline thereof, and a second row of sequential action images having an ordered exhibition sequence in the opposite direction of said first row medium movement with each image in said second row having said first row image orientation, said second row disposed to extend along said medium on the other side of said film centerline wherein the step of producing said first row includes the step of:

as said film moves in said direction, photographing a scene directly onto the film through the lens and aperture plate of a motion picture camera;

and wherein the step of producing said second row includes the steps of:

turning said film relative to the camera through 180° about a point on said film centerline and perpendicular to the film plane to align a scene to be photographed with the potential second row portion of said film;

turning the camera and film as a unit 180° about its optical axis thereby to dispose the film in the same relative position as during said first row production to produce a resutlant second row image orientation corresponding to that of said first row;

and photographing the scene directly as said film moves in said opposite direction.

2. The method of claim 1 wherein the step of producing said second row further includes:

removing said film from said camera prior to turning the said film;

and reinserting said film into the camera before turning said camera.

3. The method of claim 1 further including the step of recording a correlated sound track on said film simultaneously with filming of one of said rows.

4. The method of claim 1 wherein filming of said rows is performed while said film moves along a horizontal path in said directions, thereby to orient said images perpendicular to the longitudinal film centerline.

5. The method of claim 1 wherein filming of said rows is performed while said film moves along a vertical path in said directions thereby to orient said images parallel to the longitudinal film centerline.

References Cited

UNITED STATES PATENTS

| | | | |
|---|---|---|---|
| Re. 21,435 | 4/1940 | Scheibell | 352—38 |
| 3,115,806 | 12/1963 | Beyer et al. | 88—24 |
| 3,248,164 | 4/1966 | Wells | 352—29 |
| 3,355,292 | 11/1967 | White | 352—239 X |
| 2,091,508 | 8/1937 | Howell | 352—83 |
| 2,735,332 | 2/1956 | Mihalyi | 352—83 |

FOREIGN PATENTS

| | | |
|---|---|---|
| 21,467 | of 1909 | Great Britain. |
| 1,051,139 | 9/1953 | France. |

JULIA E. COINER, Primary Examiner

U.S. Cl. X.R.

352—46, 83, 232